Figure 1:
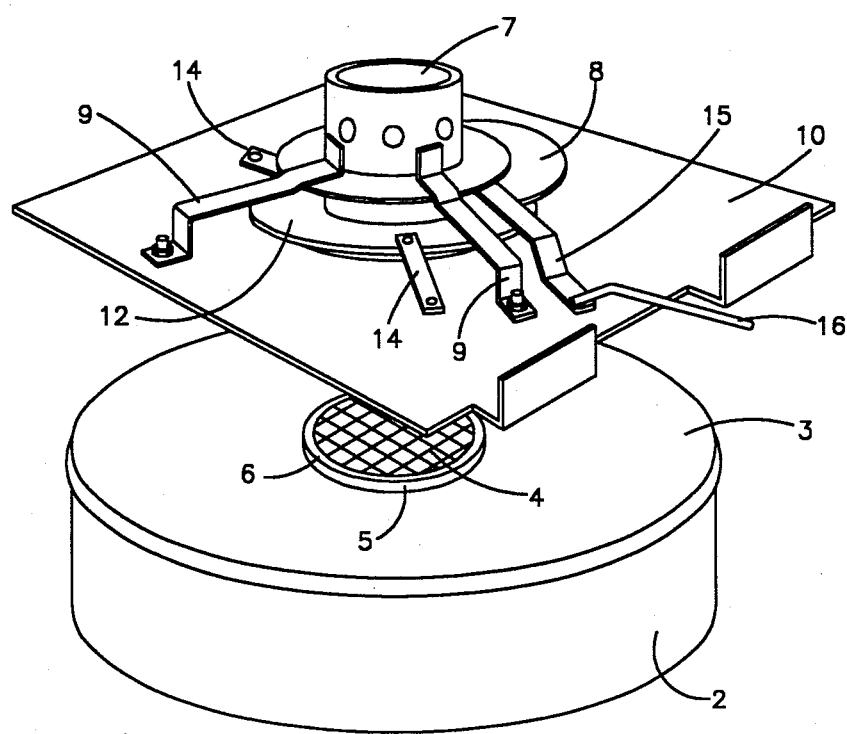

United States Patent

Boij

[11] Patent Number: 4,895,132
[45] Date of Patent: Jan. 23, 1990

[54] SPIRIT STOVE

[76] Inventor: Arne K. O. Boij, Verkstadsgatan 8, Tranås, Sweden, S-573 01

[21] Appl. No.: 235,890
[22] PCT Filed: Dec. 22, 1987
[86] PCT No.: PCT/SE87/00626
 § 371 Date: Aug. 15, 1988
 § 102(e) Date: Aug. 15, 1988
[87] PCT Pub. No.: WO88/04533
 PCT Pub. Date: Jun. 30, 1988

[30] Foreign Application Priority Data
Dec. 22, 1986 [SE] Sweden ................................ 8605528

[51] Int. Cl.⁴ .............................................. F24C 5/00
[52] U.S. Cl. ........................................ 126/48; 126/43
[58] Field of Search ................... 126/43, 45, 48, 44, 126/38

[56] References Cited
U.S. PATENT DOCUMENTS

| | | | |
|---|---|---|---|
| 1,542,852 | 6/1925 | Busch | 126/43 |
| 1,547,200 | 7/1925 | Busch | 126/43 |
| 2,610,674 | 9/1952 | Laliberte | 126/43 |
| 3,130,774 | 4/1964 | Kruck | 126/43 |
| 3,371,659 | 3/1968 | Paspalas | 126/43 |

FOREIGN PATENT DOCUMENTS 330475 4/1919 Fed. Rep. of Germany .
324157 8/1920 Fed. Rep. of Germany .
335556 2/1959 Switzerland .

Primary Examiner—Ira S. Lazarus
Assistant Examiner—Christopher Hayes
Attorney, Agent, or Firm—Pearne, Gordon, McCoy & Granger

[57] ABSTRACT

Apparatus for burning spirit or similar liquid fuel having a container (2) filled with a fuel absorbing mass with a partly exposed surface from which the fuel being burned is evaporated. A draught or burner tube (7) is so arranged with respect to the exposed surface that inlet flow of combustion air into the tube is safeguarded. The fuel container comprises a central opening which is limited by an edge part (5) which extends upwards with respect to the top surface of the container and with which a moveable control and extinguishing device is arranged to cooperate by completely or partly covering the opening for control and extinguishing purposes. A seat ring (12) is placed between the edge part (5) and a control and extinguishing plate (8) at such a distance above a heat protective metal plate that spirit vapor and remaining flames if any are burned out between the control and extinguishing plate (8) and the heat protective metal plate (10) above the metal plate (10).

9 Claims, 3 Drawing Sheets

SPIRIT STOVE

This invention relates to an apparatus for burning spirit or similar liquid fuel having a fuel container filled with a fuel absorbing mass with partly exposed surface from which the fuel being burned evaporates and a draught- or burner tube being so arranged with respect to the exposed surface that inlet flow of combustion air into the tube is safeguarded, the fuel container being separate and removable from the remaining parts of the apparatus and having top-, bottom- and side walls enclosing the absorbing mass, the top wall for providing the exposed surface comprising a central opening which is limited by an edge part of the top wall extending upwards with respect to the top surface of the container, the edge part having an annular upper surface with which a movable control and extinguishing device cooperates by partly or completely covering the opening for control and extinguishing purposes.

A general purpose of the invention is to achieve an arrangement facilitating the burning out of spirit vapors and remaining flames if any between the control device and the heat protective metal plate which is arranged to protect the heat sensitive parts of the fuel container.

A further purpose of the invention is to create an arrangement preventing too large power from being taken out.

According to a first aspect of the invention an apparatus of the type described above is characterized by a seat ring which is placed between the annular upper surface and a control- end extinguishing plate at such a distance above a heat protective metal plate surrounding the upwards extending edge part for completely or partly covering the opening, that spirit vapors and remaining flames if any are burned out between the control- and extinguishing plate and the heat protective metal plate above the lastmentioned. The seat ring may have a smaller inner diameter and/or a larger outer diameter than the upwards extending edge part. The seat ring can also be supported by the heat protective metal plate for instance at a fixed distance above the later which mainly corresponds to the height of the upwards extending edge part, or the seat ring can be resiliently supported by the heat protective metal plate for instance be fastened to it by means of leaf springs.

According to another aspect of the invention the control and extinguishing device comprises at least two mainly segment- or crescent shaped plates which are movably linked to each other and connected to a control means which is arranged for allowing variation of the opening surrounded by the plates between completely closed position and a maximal opening position.

The plates can each, via an arm, be pivotally connected to the heat protective metal plate each at pivot point placed outside the plate.

At each pivot point a follower link is connected to the corresponding arm, the follower links at two adjacent pivot points engaging each other in order to achieve a syncronuos movement of the associated plates towards or away from each other when operating one of the follower links by means of an outer control device.

In order to safeguard a simple and suitable control of the segment- or crescentshaped plates the follow link relating to one of the arms comprises the pivot point of said arm between the connecting point of the link with the arm and the link connecting point with the other follower link, the first follower link supporting a control arm with which the control device is engaged in order to turn the link about said pivot point.

An apparatus for burning spirit or similar liquid fluids having a fuel container filled with a fuel absorbing mass with partly exposed surface from which the fuel which is being burned evaporates whereby a draught or burning pipe is so arranged with respect to the exposed surface that drawing of combustion air into the tube is safeguarded and the fuel container comprises a central opening which is intended to partly or completely be covered by a control- and extinguishing device, according to a further aspect of the invention characterized in that a removable, above the burning pipe arranged flame spreader supports a locking device engaging the link mechanism of the control- and extinguishing device arranged to limit the movement of the control and extinguishing device in the direction of uncovering the central opening.

Figure 2:
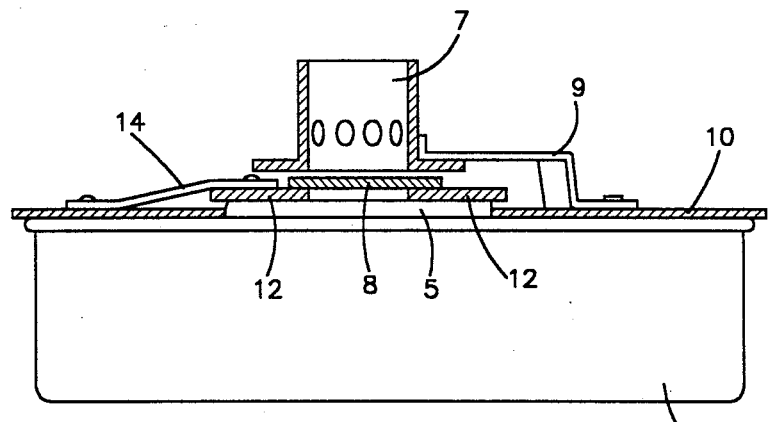
Figure 3:
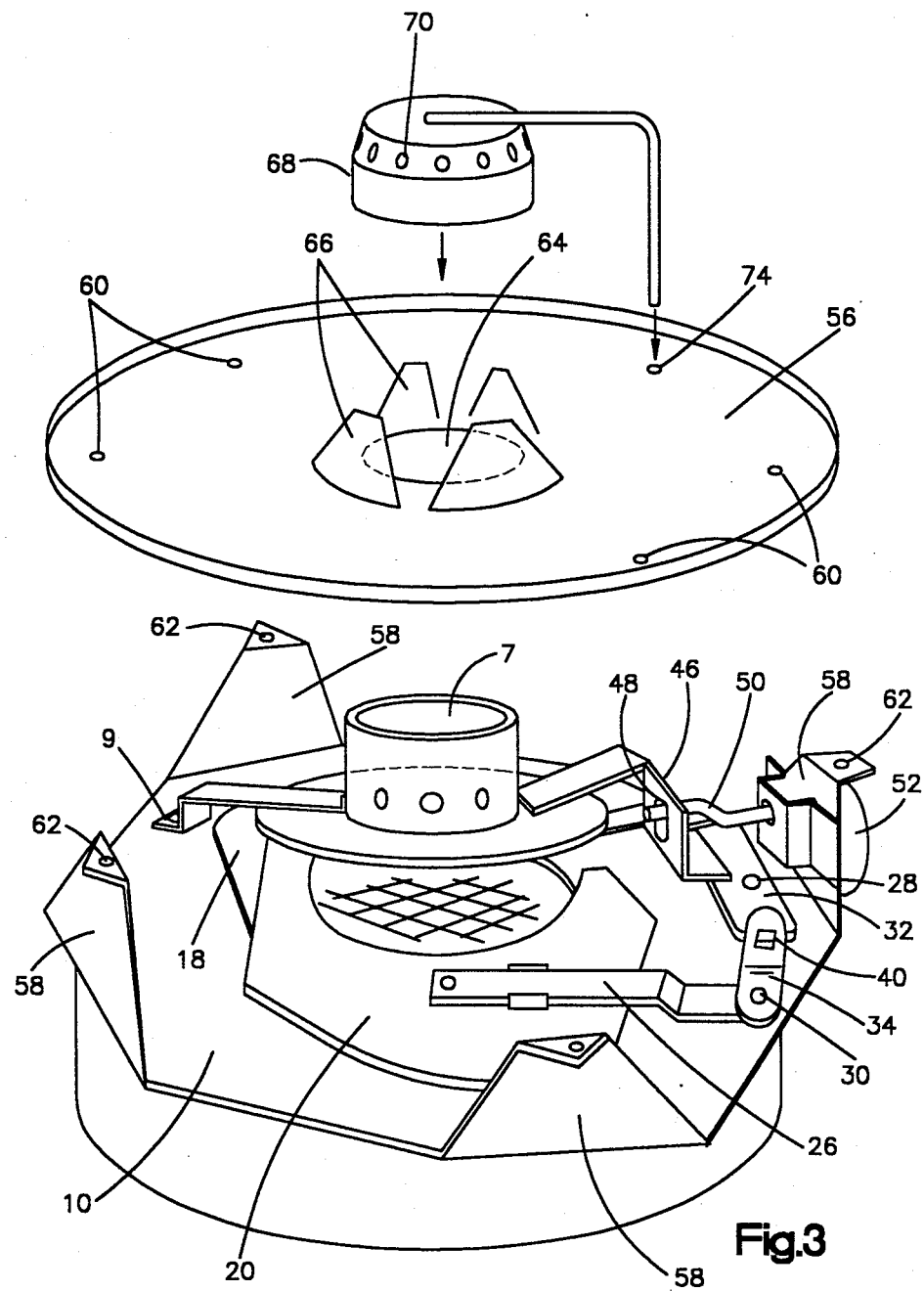
Figure 4:
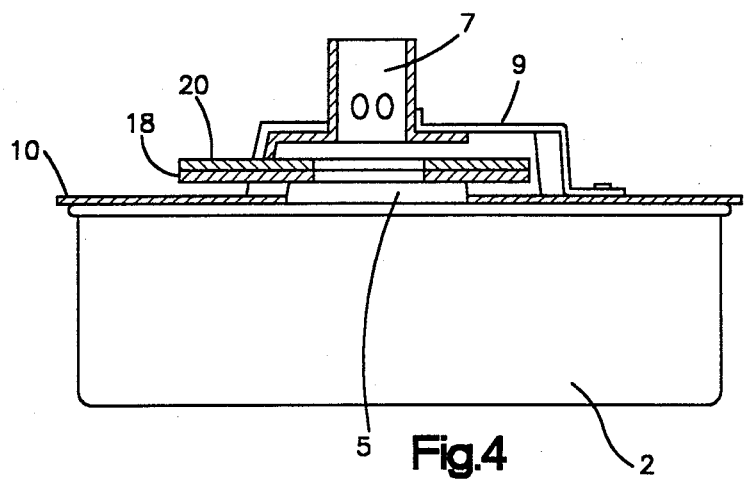
Figure 5:
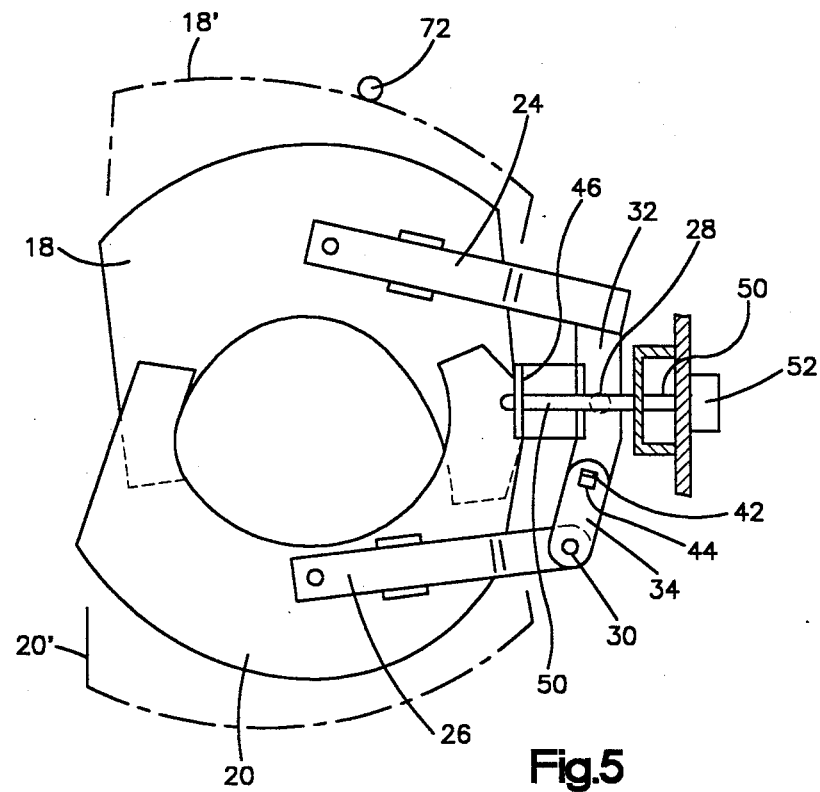

The invention will now be described more in detail below with reference to the accompanying drawings on which FIG. 1 shows an exploded perspective view of the active parts of a spirit stove according to a first embodiment of the invention FIG. 2 shows the parts according to FIG. 1 in a side elevation view with certain parts partly in section FIG. 3 shows an exploded view of the active parts of a spirit stove according to a second embodiment of the invention FIG. 4 shows a side elevation view partly broken of the spirit stove mechanism shown in FIG. 3 with certain parts in FIG. 3 left aside and FIG. 5 shows a top view of the spirit stove mechanism according to FIG. 3 extinguishing- and control device.

The drawings only show the necessary mechanismes of the spirit stove for understanding the aspects of the invention. Consequently the outer covers of the spirit stove, the support for the pots and pans, etc. are omitted. Concerning such details of spirit stoves on the market it is referred to the spirit stove models No. 4000, 5000, D4, D3, 2500, C7, K2, C5 and 2000 of Aktiebolaget Jobo. For the same purpose it is also referred to the originally published text of the European patent application No. 81902014.0. Further it is generally referred to the content of said European patent application text and the European patent which was sealed on the 17th Apr., 1985.

In the drawings similar or similarly operating parts of the different embodiments have been provided with the same references.

In FIG. 1 a fuel container 2 which is closed comprises at its top wall 3 a central opening 4 which is limited by an, with respect to the remaining parts of the top surface, upwards extending edge part 5 having an annular upper surface 6. The fuel container 2 is filled with a fuel absorbing mass with an exposed surface in the central opening 4, from which surface the fuel which is to be burned evaporates. The fuel container 2 is separate and removable from the spirit stove.

A draught- or burner tube 7 is so arranged with respect to the exposed surface 4 that the flow of combustion air into the tube is safeguarded. Below the burner tube 7 a control and extinguishing plate 8 is provided in order to partly or completely cover the central opening 4 for control- and extinguishing purposes.

The burner tube 7 is by means of arms 9 fastened to a heat protective metal plate 10. The plate 10 has a mainly central opening with a diameter mainly corresponding the outer diameter of the edge part 5 and covers the container about the upwards extending edge part 5 at a level which is situated below the annular shaped upper surface 6.

A seat ring 12 for the control- and extinguishing plate 8 is by means of two leaf springs 14 fastened to the heat protective metal plate 10 so that it abuts the upper surface 6 of the upwards extending edge part 5. The seat ring 12 has, according to the embodiment shown, a larger outer diameter and a smaller inner diameter than the upwards extending edge part 5.

At the center of the plate 8 an operating arm 15 is shown which in a known manner is pivotally supported and by means of a handle 16 extends outside the cover, not shown, of the spirit stove in order to operate the control- and extinguishing plate 8 from outside by turning the arm 15. In FIG. 2 the plate 8 is shown in a position completely covering the exposed surface and abutting the seat ring 12 which in turn abuts the upper annular surface 6 of the upwardly extending edge part 5.

The embodiment shown in FIG. 3–5 differs from the one according to FIG. 1 and 2 mainly by the replacement of the control- and extinguishing plate 8 and the seat ring 12 by another control mechanism.

This control mechanism comprises two crescent shaped plates 18 and 20 which are movably connected to each other by, arms 24 and 26, being pivotally connected to the heat protective metal plate 10 at pivot points 28 and 30 which are placed outside each plate 18, 20.

A follower link 32 and 34 respectively is fixed to a corresponding arm 24 and 26, the follower links 32 and 34 engaging each other at 40 in order to achieve syncronous movement of associating plates 18, 20 towards and away from each other when moving the follower link 32 in a way which is described below by means of an outer operating device. Said engagement at 40 is achieved by an upwardly extending tongue 42 of the follower link 32 which is movably guided in an endslot 44 on the follower link 34.

As clearly appears from FIG. 5 the follower link 32 of the arm 24 is pivotally fastened to the heat protective plate 10 at the pivot point 28 between the connecting point of the link 32 with the arm 24 and the connecting point 40 between the link 32 and the follower link 34. The follower link 32 supports an upwardly extending operating arm 46. The arm 46 comprises a vertical slot 48 in which one end of a crank pin 50 is inserted the other end of which supports an operating knob 52. The arrangement 46-52 is at the shown embodiment in principle a known design and admits turning of the link 32 about the pivot point 28 in order to adjust the plates 18 and 20 with respect to each other so that the opening surrounded by them can be varied between a completely closed state in which the surface 4 of the fuel mass is completely covered and a maximal exposed surface corresponding to the total surface 4.

A combined radiation-protective and spill over metal plate 56 is by means of a screw joint, not shown in detail, fastened at upwardly extending lugs 58 of the heat protective plate 10. At 60 and 62, respectively screw holes are shown in the plate 56 and in the lugs 58. One of said lugs 58 comprises a bear ring hole for the crank pin 50.

The metal plate 56 comprises a central opening 64 for the burner tube 7. The opening 64 is surrounded by upwardly extending center lugs 66 for a flame spreader 68 positioned above the opening 64 when necessary. The flame spreader 68 is cup shaped and has flame openings 17 equally placed about its upper inclined edge and is fastened if the spirit stove should be used as a heating device.

At the upper side of the flame spreader 68 one end of a bent locking arm 72 is fastened. When using the flame spreader the bent arm 72 extends through a hole 74 in the metal plate 56 and into the moving path of the plate 18. The hole 74 is situated so that when the flame spreader 68 is used the exposed surface 4 is only uncovered to a certain degree since the control- and extinguishing plate 18, abuts the locking arm 72 as shown with dash dotted lines 18' in FIG. 5 whereby the possible power take out is limited.

If the control and extinguishing device 18, 20 has such a position that the plate 18 is outside the position 18' fastening of the flame spreader is prevented since the locking arm 72 then abuts the upper surface of the plate 18.

In the embodiments shown above there is a distance between the heat protective metal plate 10 and the seat ring 12 and extinguishing plates 18, 20, respectively which facilitates spirit vapor and remaining flames if any to burn out between the control mechanism and the heat protective plate above the lastmentioned.

The invention is of course not limited to the described and shown embodiments but can be a varied within the scope of the attached claims. For instance the seat ring can directly or indirectly be fastened to the burning tube instead of being fastened to the heat protective plate.

I claim:

1. Apparatus for burning spirit or similar liquid fuel having a fuel container (2) filled with a fuel absorbing mass with a partly exposed surface from which the fuel being burned evaporates and, a draught or burner tube (7) being so arranged with respect to the exposed surface that inlet flow of combustion air into the tube is safeguarded, the fuel container being separate and removable from the remaining parts of the apparatus and having top, bottom and sidewalls enclosing the absorbing mass, the top wall for providing the exposed surface comprising a central opening (4) which is limited by an edge part (5) on the top wall extending upwards with respect to the top of the surface container, the edge part having an annular upper surface (6) with which a movable control and extinguishing device cooperates by partly or completely covering the opening (4) for control and extinguishing purpose, characterized in that a seat ring (12) is placed between the annular upper surface (6) and a control and extinguishing plate (8) at such a distance above a heat protective metal plate (10) surrounding the upwards extending edge part (5) for completely or partly covering the opening (4) said metal plate (10) being below said annular upper surface (6), wherein spirit vapors and remaining flames if any are burned out between the control and extinguishing plate (8) and the heat protective metal plate (10) do not directly heat the top (3) of the container (2) due to the heat shielding effect of the metal plate (10).

2. Apparatus according to claim 1, characterized in that the seat ring (12) is supported resiliently by and above the heat protective metal plate (10).

3. Apparatus according to claim 2, characterized in that the seat ring (12) is fastened by means of leaf springs (14) at the heat protective plate (10).

4. Apparatus according to claim 1, characterized in that the control- and extinguishing plates (8) and the seat ring (12) is replaced by at least two mainly crescent shaped plates (18, 20) which are movably linked to each other and connected to a control means (24-52) which is arranged for a allowing variation of the opening surrounded by the plates (18, 20) between a completely closed position and a maximal open position.

5. Apparatus according to claim 4, characterized in that the crescent shaped plates (18, 20) each via an arm (24, 26) are pivotally connected to the heat protective metal plate (10) at a pivot point (28, 30) for each arm situated outside the plates (10).

6. Apparatus according to claim 5, characerized in that at each pivot point (28, 30) a follower link (32,34) is fixed to a corresponding arm (24,26) the follower links (32,34) at two adjacent pivot point (28,30) engaging each other in order to achieve a syncronous movement of the plates towards and away from each other when operating one of the follower links (32) by means of an outer control device (52).

7. Apparatus according to claim 6, characterized in that the follower link (32) of one arm (24) comprises the pivot point (28) of said arm between the connecting point of the link (32) to the arm (24) and the point (40) of engagement of the link with the other follower link (34) whereby the first mentioned follower link (32) supports an operating arm (46) connected to the control device (52) in order to turn the link (32) about said pivot point (28).

8. Apparatus according to claim 1, characterized in that a removable flamespreader (68) is arranged above the burner tube (7) and is provided with a locking device (72) engaging the mechanism of the control- and extinguishing device for limiting the movement of the control- and extinguishing plates (to 18',20') in a direction uncovering the central opening (4).

9. Apparatus according to claim 8, characterized in that the locking device (72) prevents the application of the flame spreader (68) if the control- and extinguishing plates (18,20) are in such a position with respect to the central opening (4) that a given maximal power take out is exceeded.

* * * * *